(12) United States Patent
Suzuki et al.

(10) Patent No.: US 8,195,374 B2
(45) Date of Patent: Jun. 5, 2012

(54) CONTROL DEVICE FOR MOTOR THAT DRIVES A VEHICLE

(75) Inventors: Kenji Suzuki, Anjo (JP); Hiromichi Agata, Anjo (JP); Tatsuyuki Uechi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 2600 days.

(21) Appl. No.: 10/902,804

(22) Filed: Aug. 2, 2004

(65) Prior Publication Data

US 2005/0055141 A1 Mar. 10, 2005

(30) Foreign Application Priority Data

Sep. 4, 2003 (JP) .................................. 2003-313210

(51) Int. Cl.
*G06F 19/00* (2011.01)
(52) U.S. Cl. ............ 701/99; 701/22; 318/432; 318/434
(58) Field of Classification Search .................. 318/433; 310/53, 68 C; 388/930, 934
See application file for complete search history.

(56) References Cited

U.S. PATENT DOCUMENTS

| | | | | |
|---|---|---|---|---|
| 4,423,362 A | * | 12/1983 | Konrad et al. ................. | 318/139 |
| 5,070,832 A | * | 12/1991 | Hapka et al. ............. | 123/198 D |
| 5,186,081 A | * | 2/1993 | Richardson et al. ............ | 477/33 |
| 5,446,362 A | * | 8/1995 | Vanek et al. .................. | 318/801 |
| 5,620,646 A | * | 4/1997 | Sparer et al. ............. | 264/328.14 |
| 5,675,464 A | * | 10/1997 | Makaran et al. ................. | 361/23 |
| 5,908,154 A | * | 6/1999 | Sunaga et al. ............... | 236/49.3 |
| 5,923,135 A | | 7/1999 | Takeda | |
| 6,098,576 A | * | 8/2000 | Nowak et al. .............. | 123/41.33 |
| 6,114,828 A | * | 9/2000 | Matsunaga et al. ........... | 318/782 |
| 6,330,873 B1 | * | 12/2001 | Letang et al. .................. | 123/322 |
| 6,394,044 B1 | * | 5/2002 | Bedapudi et al. .......... | 123/41.33 |
| 6,465,978 B2 | * | 10/2002 | Takahashi ...................... | 318/432 |
| 6,529,394 B1 | * | 3/2003 | Joseph et al. .................. | 363/141 |
| 6,548,975 B2 | * | 4/2003 | Kleinau et al. ................. | 318/434 |
| 6,601,546 B1 | * | 8/2003 | Mohr et al. ................. | 123/41.49 |
| 7,071,649 B2 | * | 7/2006 | Shafer et al. ................... | 318/783 |
| 7,131,933 B2 | * | 11/2006 | Tabata .......................... | 477/181 |
| 2003/0130772 A1 | * | 7/2003 | Yanagida et al. ............... | 701/22 |

FOREIGN PATENT DOCUMENTS

| | | |
|---|---|---|
| JP | A 9-215388 | 8/1997 |
| JP | A-10-164703 | 6/1998 |
| JP | A-11-55803 | 2/1999 |
| JP | A-2002-51583 | 2/2002 |

* cited by examiner

*Primary Examiner* — Thomas G. Black
*Assistant Examiner* — Sze-Hon Kong
(74) *Attorney, Agent, or Firm* — Oliff & Berridge, PLC

(57) ABSTRACT

A control device for a motor that drives a vehicle and controls the motor by controlling an inverter device that converts a direct voltage, supplied from a direct current source, into an alternating voltage to be supplied to the motor, the control device having a refrigerant temperature detector that detects a refrigerant temperature of a heat exchanger for heat exchange with the inverter device, and a torque restrictor that restricts an output torque of the motor when the inverter device is put in a predetermined state, wherein the torque restrictor changes restrictions on the output torque on the basis of the refrigerant temperature detected by the refrigerant temperature detector.

12 Claims, 4 Drawing Sheets

CONTROL DEVICE FOR MOTOR THAT DRIVES A VEHICLE

This application claims priority from JP 2003-313210, filed Sep. 4, 2003, the disclosure of which is incorporated in its entirety herein by reference thereto.

BACKGROUND OF THE INVENTION

1. Field of Invention

The invention relates to a control device for a motor that drives a vehicle.

2. Description of Related Art

Known as a control device of this type for a motor that drives a vehicle is one that controls a motor by controlling an inverter device, which converts a direct voltage supplied from a direct current source, into an alternating voltage to supply the same to a motor that drives a vehicle. This causes a problem that when the vehicle stalls, the motor is put in a locked state whereby an electric current concentrates on a particular switching element or elements that constitute the inverter device and the switching element or elements are broken or damaged due to generation of heat.

In order to avoid damage to the inverter device due to the generation of heat at the time of stall, a time, during which an electric current can be carried to the motor, from the start of stall is calculated on the basis of a torque value (or a value of an electric current supplied to the motor) at which the motor is controlled, and supplying of a drive current to the motor is stopped after the current-carrying enabling time has elapsed. As described in Japanese Patent Document JP-A-9-215388 (paragraphs 0028 to 0037, FIGS. 4 to 6), an integral value of the square of a motor drive current I for respective phases is detected (S11). Whenever the detected current becomes 0, the integral value is reset (S12, S13), and, when the integral value exceeds a predetermined value, it is detected that an electric current of a particular magnitude is continuously carried due to the locking of the motor, and the inverter device is protected (S14, S15).

SUMMARY OF THE INVENTION

In the control device described above, although the inverter device is protected by stopping the supply of a drive current to the motor after the current-carrying enabling time has elapsed from the start of stall, a refrigerant temperature of the inverter device at the start of stall, or temperature (for example, a cooling-water temperature of the inverter device) correlating to the refrigerant temperature is not taken account of. Therefore, in the case where the atmosphere temperature is high, breaking temperatures of the switching elements that constitute the inverter device are reached before the current-carrying enabling time as calculated is reached, and so there is a fear that the switching elements are thermally broken. Also, in the case where the atmosphere temperature is low, the switching elements do not reach the breaking temperatures even when the current-carrying enabling time has elapsed, and so the switching elements have a thermal scope. That is, a current-carrying enabling time can be set longer than that as calculated. Also, because current carrying is stopped after the current-carrying enabling has elapsed, there is a fear that the inverter device cannot adequately exhibit its performance in the case where the switching elements have a thermal scope.

Hereupon, the invention, at least addresses and solves the respective problems described above. One object of the exemplary embodiment is to control a motor on the basis of the atmosphere temperature of an inverter device at the start of stall, thereby surely protecting the inverter device and having the inverter device adequately exhibiting its performance.

In order to solve the problems, the invention has a feature in a control device for a motor that drives a vehicle and for controlling the motor by controlling an inverter device that converts a direct voltage supplied from a direct current source, into an alternating voltage to supply the same to the motor, the control device comprising refrigerant temperature detection means that detects a refrigerant temperature of a heat exchanger for heat exchange with the inverter device, and torque restriction means that restricts an output torque of the motor when the inverter device is put in a predetermined state, wherein the torque restriction means changes restrictions on the output torque on the basis of the refrigerant temperature detected by the refrigerant temperature detection means.

BRIEF DESCRIPTION OF THE DRAWINGS

The invention will be described with reference to the drawings, in which.

DETAILED DESCRIPTION OF PREFERRED EMBODIMENTS

Figure 1:
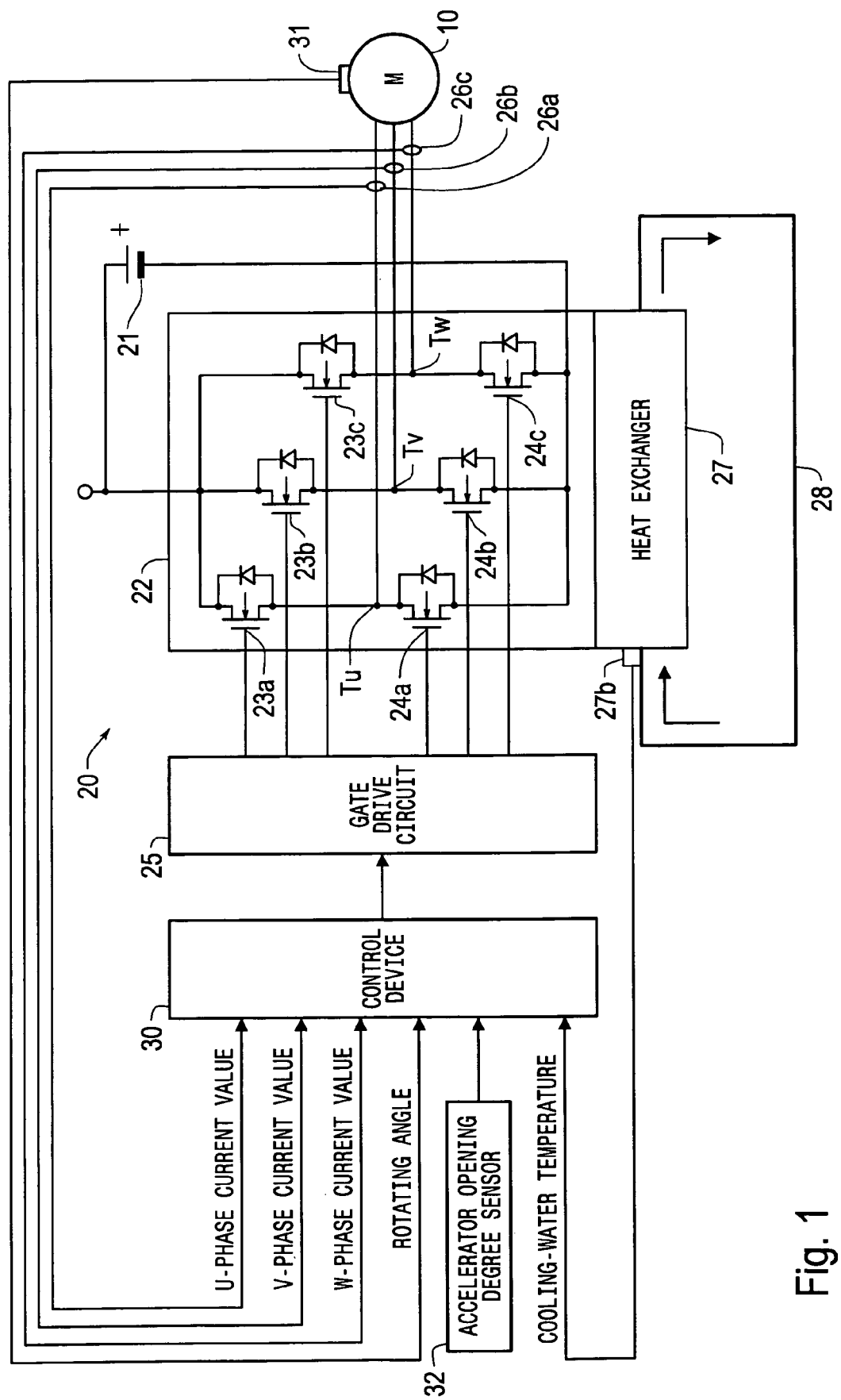
FIG. 1 is a block diagram showing an exemplary embodiment of a control device for a motor that drives a vehicle.

The vehicle is a so-called electric automobile provided with a motor 10 as a drive source. The vehicle is driven by the motor 10 for travel. As illustrated by FIG. 1, for example, the motor 10 is a three-phase ac motor comprising respective windings (not shown) of U-phase, V-phase, and W-phase. The windings are connected to an inverter circuit 22 that constitutes an inverter device 20. The inverter device 20 converts a direct voltage supplied from a battery 21, a direct current source, into an alternating voltage on the basis of a torque command value from a control device 30, and successively supplies the alternating voltage to the respective windings of U-phase, V-phase, and W-phase. The alternating voltage is supplied to the windings of the respective phases whereby the motor 10 is driven.

The inverter device 20 comprises the inverter circuit 22 that converts the direct current voltage from the battery 21 into an alternating current voltage to supply the same to the motor 10. The inverter circuit 22 comprises switching elements 23*a*, 23*b*, 23*c*, 24*a*, 24*b*, 24*c* in an upper and a lower stage. The respective switching elements 23*a*, 23*b*, 23*c*, 24*a*, 24*b*, 24*c* comprise, for example, MOSFET (MOS type field-effect transistor). The switching elements 23*a*, 23*b*, 23*c* in the upper stage have drains connected to the plus side of the battery 21, the dc power source, and have gates connected to a gate drive circuit 25, and have sources thereof connected to drains of the switching elements 24a, 24b, 24c in the lower stage. The switching elements 24a, 24b, 24c in the lower stage have gates connected to the gate drive circuit 25 and have sources thereof connected to the minus side of the battery 21. The gate drive circuit 25 receives a torque command value from the control device 30 to generate a pulse width modulation (PWM) signal corresponding to the torque command value to forward the same to the switching elements 23a, 23b, 23c, 24a, 24b, 24c to control the same.

Respective intermediate points Tu, Tv, Tw of the switching elements 23a, 23b, 23c, 24a, 24b, 24c, respectively, in the upper and lower stage are connected to windings of U-phase, V-phase, and W-phase of the motor 10. An electric current being carried to the respective windings is detected by current detection sensors 26a, 26b, 26c and detected values are forwarded to the control device 30.

Figure 2:
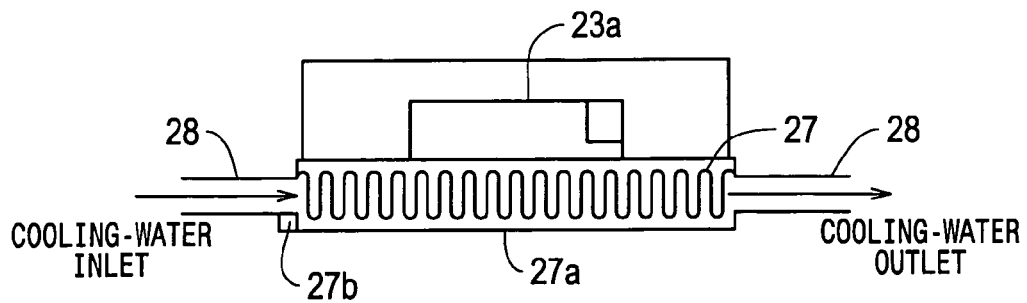
FIG. 2 is a cross sectional view schematically showing the inverter device in FIG. 1.

Also, the inverter device 20 comprises a heat exchanger 27 that decreases temperatures of the respective switching elements 23a, 23b, 23c, 24a, 24b, 24c that generate heat upon current-carrying and become high in temperature. The heat exchanger 27 comprises, as shown in FIG. 2, the switching element 23a (illustration of the remaining switching elements being omitted) fixed closely to one external side thereof, and a cooling-water passage 27a formed therein to have cooling water, being a refrigerant, passing therethrough. The ends of a cooling system 28 are respectively connected to an inlet and an outlet of the cooling-water passage 27a. The cooling system 28 decreases the temperature of the high-temperature cooling water, which is discharged from the heat exchanger 27, to supply the cooled water to the heat exchanger 27. A cooling-water temperature sensor 27b that detects the temperature of the cooling water is provided at the inlet of the cooling-water passage 27a, and the temperature of the cooling water detected by the cooling-water temperature sensor 27b is transmitted to the control device 30.

Connected to the control device 30 are a rotation sensor 31, that detects a rotating angle of the motor 10, and an accelerator opening degree sensor 32, that detects an opening degree of the accelerator (not shown) on the vehicle. The rotation sensor 31 forwards the detected rotating angle of the motor 10 to the control device 30, and the control device 30 calculates a rotating speed of the motor 10 on the basis of the rotating angle. The accelerator opening degree sensor 32 forwards the detected accelerator opening degree to the control device 30. The control device 30 determines a torque command value of the motor 10 on the basis of the rotating speed of the motor 10 and the accelerator opening degree and forwards the torque command value to the gate drive circuit 25. The gate drive circuit 25 forwards a PWM pulse waveform, corresponding to the torque command value, to the inverter device 20 to supply an alternating current to the motor 10.

The control device 30 comprises a microcomputer (illustration thereof being omitted), and the microcomputer comprises input-output interfaces, CPU, RAM and ROM (illustration of all thereof being omitted), respectively, connected together via buses. The CPU implements a program, corresponding to the flowchart shown in FIG. 5, to calculate a current-carrying enabling time from an operation expression or a three-dimensional map (described later) on the basis of a cooling-water temperature and a torque value at the start of stall to control the motor 10 at a torque value at the start of stall until the calculated current-carrying enabling time has elapsed. The ROM stores the program, an operation expression or a table (see FIG. 3) representative of the correlation between a continuous operation enabling torque and a cooling-water temperature, an operation expression or a three-dimensional map (see FIG. 4) representative of the correlation among the cooling-water temperature, the torque value, and time, during which an electric current can be carried to the motor. In addition, these matters may be stored in other storage devices instead of a ROM. The RAM temporarily stores calculated values related to control.

Figure 3:
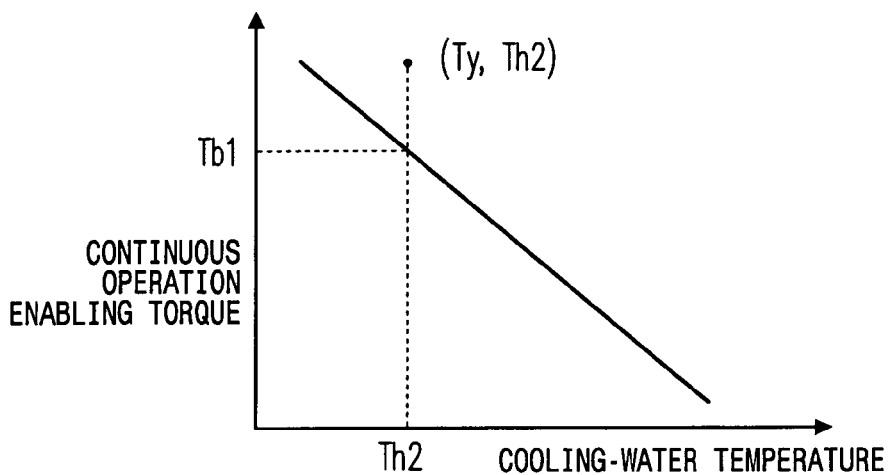
FIG. 3 shows a curve representative of the correlation between a cooling-water temperature and a continuous operation enabling torque, which is stored in the control device of FIG. 1.

The curve (an operation expression or a table) as shown in FIG. 3, indicates the correlation between a continuous operation enabling torque and a cooling-water temperature, which are predetermined and stored in the control device 30. The continuous operation enabling torque is an operation enabling torque at a certain point of time, by which the motor 10 can be continuously operated on and after the certain point of time. In particular, in the embodiment, the continuous operation enabling torque is an operation enabling torque at the start of stall, by which the motor 10 can be continuously operated on and after the start of stall. In accordance with the curve, when a cooling-water temperature and a torque command value are known at a certain point of time, it is possible to judge whether operation is possible at the torque command value on and after the certain point of time. That is, when coordinates of a cooling-water temperature and a torque command value are disposed in a range above a curve representative of the correlation between a continuous operation enabling torque and a cooling-water temperature, it can be judged that the continuous operation is impossible, and when the coordinates are disposed in a range below the curve, it can be judged that the continuous operation is possible.

Such a curve is created in the following manner. Assuming that a vehicle is put into a stall state, a torque command value at the start of stall is changed to desired values with a cooling-water temperature at the start of stall as it is, whether operation is possible at the torque value on and after the start of stall is judged while measuring temperature of that switching element, in the inverter device, to which a largest quantity of electric current is carried, and a continuous operation enabling torque value is measured. The measurement is performed while the cooling water is changed in temperature. On the basis of these measurements, a curve representative of the correlation between a continuous operation enabling torque and a cooling-water temperature is created, or an operation expression is calculated. In addition, continuous operation enabling torques at respective temperatures of the cooling water may be stored as a table in the control device 30.

Figure 4:
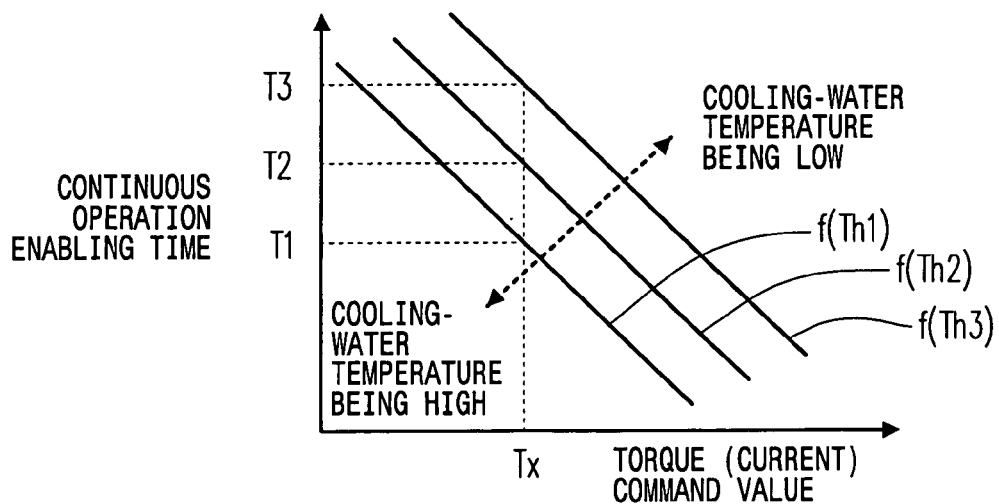
FIG. 4 shows a three-dimensional map representative of the correlation among a cooling-water temperature, a continuous operation enabling torque, and a current-carrying enabling time, which is stored in the control device of FIG. 1.

The curve (an operation expression or a three-dimensional map), as shown in FIG. 4, indicates the correlation among a cooling-water temperature, a torque value, and a current-carrying enabling time, which are beforehand stored in the control device 30. Cooling-water temperature means the temperature of the cooling water at the start of stall, torque value means a torque command value (current command value) commanded from the control device 30, and current-carrying enabling time means a time, during which an electric current can be carried at a commanded torque value to the motor 10. Respective curves shown in FIG. 4 indicate the correlation at different predetermined cooling-water temperatures between a torque command value and a current-carrying enabling time. These curves are aligned substantially in parallel to one another such that a curve or curves with a lower cooling-water temperature or temperatures are disposed above a curve or curves with a higher cooling-water temperature or temperatures. In accordance with the curves, with torque command value being the same, the lower a cooling-water temperature at the start of stall, the longer a current-carrying enabling time can be taken.

Such curves are created in the following manner. Assuming that a vehicle is put in a stall state, a cooling-water temperature at the start of the stall is regulated at a predetermined temperature, a torque command value at the start of the stall is changed to desired values, and a current-carrying enabling time is measured at such torque value. Thereby, one curve representative of the correlation between a torque command value and a current-carrying enabling time is created. Then, the cooling water is changed in temperature, a current-carrying time is measured likewise, and other curves representative of the correlation between a torque command value and a current-carrying enabling time are created. Thereby, a three-dimensional map is created, or an operational expression is calculated. In addition, FIG. 4 shows a curve f (Th1), a curve f (Th2), and a curve f (Th3) in the case where a cooling-water temperature takes Th1, Th2, and Th3. Also, a current-carrying enabling time for a torque command value at every preselected cooling-water temperature may be stored as a table in the control device 30.

Figure 5:
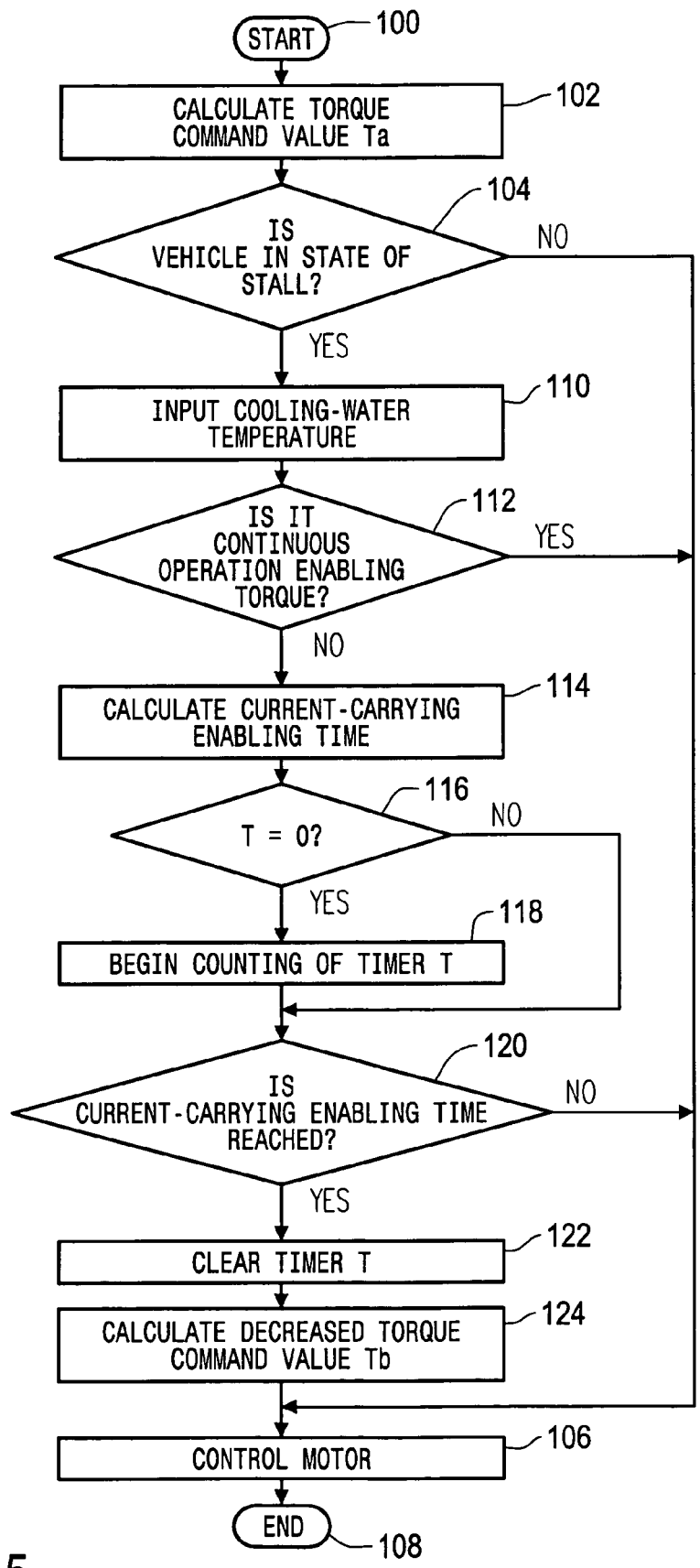
FIG. 5 is a flowchart representative of a program implemented in the control device of FIG. 1.

Next, operation of the control device, structured in the above manner, for a motor that drives a vehicle, will be described using the flowchart of FIG. 5. When an ignition switch (illustration thereof being omitted) of a vehicle is in an ON state, the control device 30 implements a program corresponding to the flowchart every predetermined short interval of time. When beginning the implementation of the program in STEP 100, FIG. 5, the control device 30 calculates a torque command value Ta on the basis of the accelerator opening degree as input and the calculated rotating speed of the motor 10 (STEP 102).

Then, the control device 30 judges whether the vehicle is in a stall state (STEP 104). More specifically, in the case where an absolute value |N| of the motor rotating speed N, calculated on the basis of a rotating speed as input, is less than or equal to a predetermined value N0 (for example, 30 rpm) and an absolute value |Ta| of the torque command value Ta, calculated on the basis of the accelerator opening degree as input and the calculated rotating speed N of the motor 10, is greater than or equal to a predetermined value Tn, it is judged that the vehicle is in a stall state. In any other case, except as noted above, it is judged that the vehicle is in a state of non-stall.

In the case where the vehicle is in a state of non-stall, the control device 30 judges "NO" in STEP 104, and subsequently outputs the torque command value Ta, calculated in STEP 102, to the inverter circuit 21 in STEP 106 to control the motor 10 at an output torque corresponding to the torque command value Ta. That is, the control device 30 performs a normal torque control. Thereafter, the program proceeds to STEP 108 and ends once.

In the case where the vehicle is in a stall state, the control device 30 judges "YES" in STEP 104, and judges in STEPS 110, 112, on the basis of a cooling-water temperature at a point of time when a stall state of the vehicle begins, whether a torque command value at that point of time is a continuous operation enabling torque command value, to thereby judge whether it is possible to control the motor 10 at such torque value on and after the stall starts. Thus, in STEP 110, the control device 30 inputs a cooling-water temperature, which is detected by the cooling-water temperature sensor 27b, simultaneously with the judgment of the state of stall. Thereby, it is possible to input the cooling-water temperature at the stall start. Then, in STEP 112, the control device uses the curve shown in FIG. 3 to judge that the continuous operation is impossible when coordinates of the torque command value Ta calculated in STEP 102 and the cooling-water temperature input in STEP 110 are disposed in a range above the curve shown in FIG. 3 and to judge that the continuous operation is possible when the coordinates are disposed in a range below the curve.

In the case where the torque command value calculated in STEP 102 is a continuous operation enabling torque command value, a load on the motor 10 is small in spite of the stall state and electricity carried to the switching elements is also small in quantity, so that the control device 30 judges "YES" in STEP 112 and controls the motor 10 at the torque command value calculated in STEP 102 (STEP 106). Thereafter, the program proceeds to STEP 108 and ends once. According to this, a comparison is made between a continuous operation enabling torque calculated on the basis of a refrigerant temperature and a torque command value of the motor, and the motor is continuously operated on the basis of results of the comparison. Accordingly, it is possible to have the inverter device adequately exhibiting its performance according to a refrigerant temperature.

On the other hand, in the case where the torque command value calculated in STEP 102 is not a continuous operation enabling torque command value, a load on the motor 10 is large and electricity carried to the switching elements is also large in quantity and generates a large quantity of heat, so that the control device 30 judges "NO" in STEP 112 and controls the motor 10 at the torque command value at the start of stall only for a current-carrying enabling time. Specifically, in STEP 114, a current-carrying enabling time is calculated from the curves (an operation expression or a three-dimensional map) shown in FIG. 4 on the basis of a refrigerant temperature (input in STEP 110) at the start of stall and a torque value (calculated in STEP 102). That is, in the case where a torque command value at the start of stall is Tx and a cooling-water temperature is Th1, a current-carrying enabling time is calculated from FIG. 4 to be T1. In the case where a torque command value is Tx and a cooling-water temperature is Th2 or Th3, a current-carrying enabling time is likewise calculated to be T2 or T3, respectively. Thereby, it can be understood that the lower a cooling-water temperature, the longer a current-carrying enabling time can be set.

Then, the control device 30 controls the motor 10 at the torque command value at the start of stall until the calculated current-carrying enabling time has elapsed. That is, when a timer T reads 0 in STEP 116, the timer T begins counting, and the motor 10 is controlled at the torque command value calculated in STEP 102 until the timer T reaches a current-carrying enabling time (STEP 100 to STEP 104, STEP 110 to STEP 120, STEP 106). In addition, because the timer T reads 0 immediately after a current-carrying enabling time is calculated, "YES" is judged in STEP 116, the timer T begins counting in STEP 118, and it is judged in STEP 120 whether the timer T has reached a current-carrying enabling time.

When the timer T has reached a current-carrying enabling time, the control device 30 controls the motor 10 at a torque short of that torque command value at the start of stall, which is calculated on the basis of a cooling-water temperature. Specifically, the timer T is cleared in STEP 122 and a torque (decreased torque value Tb) short of that torque value at the start of stall is calculated in STEP 124. In such calculation, the curve shown in FIG. 3 is used. That is, in the case where a torque command value Ta, calculated in, for example, STEP 102 is Ty, a cooling-water temperature at the start of stall is Th2, and the torque command value Ty is larger than a continuous operation enabling torque Tb1 for the cooling-water temperature Th2, the decreased torque command value Tb is reduced to at least the continuous operation enabling torque Tb1 for the cooling-water temperature Th2. In addition, the decreased torque value Tb may be smaller than a continuous operation enabling torque Tb1. Then, the control device 30 has the program proceed to STEP 106 and controls the motor 10 at the decreased torque calculated in STEP 124. Thereafter, the program proceeds to STEP 108 and ends.

Figure 6:
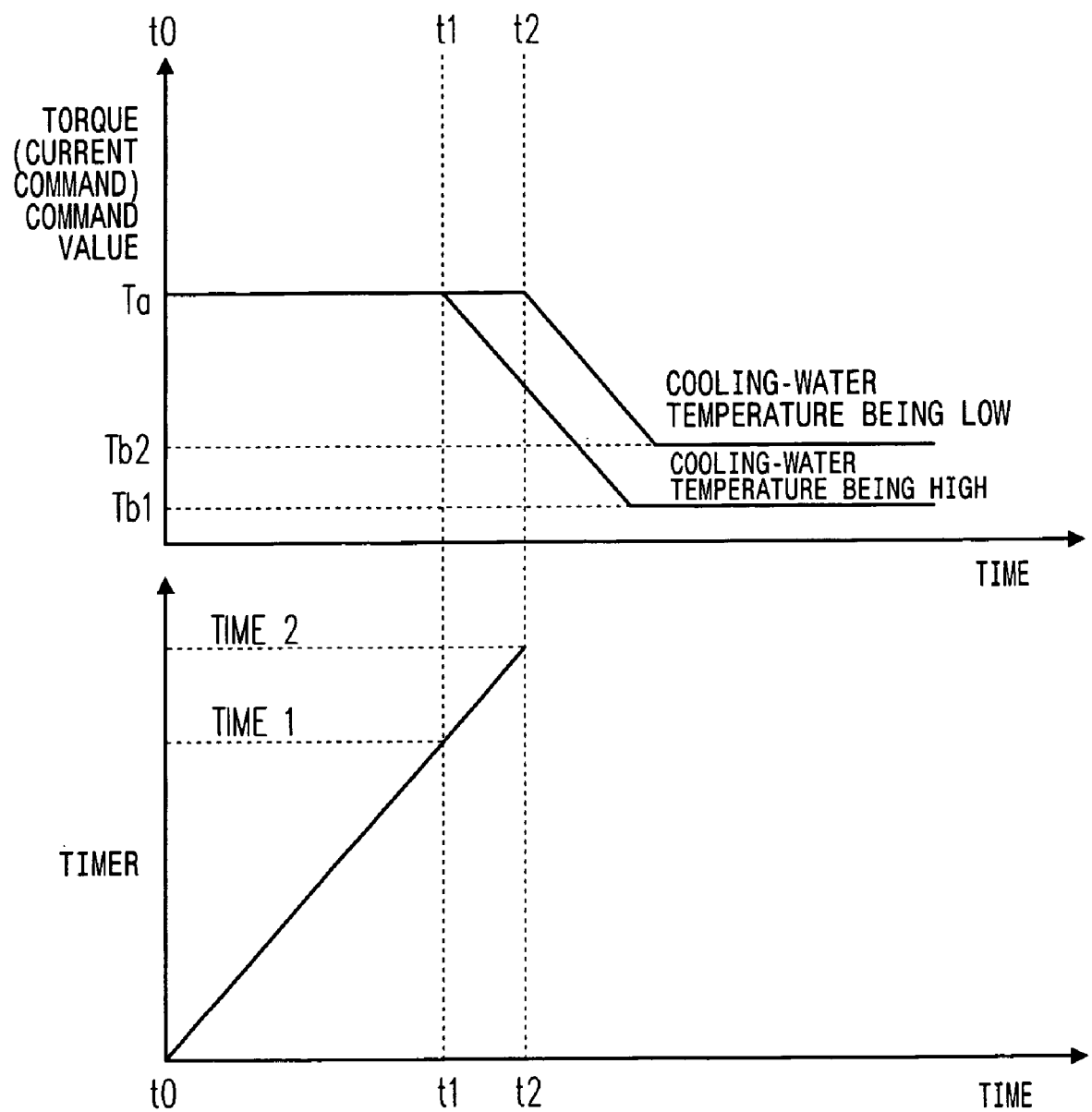
FIG. 6 is a time chart representative of an operation performed by the control device of FIG. 1.

Next, operation of the vehicle, to which the control device operating in the above manner is applied, will be described with reference to FIG. 6. FIG. 6 shows time charts for the cases where the cooling-water temperature is high and low, and represents a torque command value and a timer T.

First, an explanation will be given to the case where a cooling-water temperature is high. In the case where a vehicle on an upward slope is put in a stall state due to the balance between rearward movement by its weight and forward movement by the torque of the motor 10, and a torque command value Ta at that point of time is larger than a continuous operation enabling torque for a cooling-water temperature at that point of time, a current-carrying enabling time (time 1 in this case) is calculated at time t0 (STEP 114) and the timer T begins counting (STEP 118). The torque command value remains the torque command value Ta at the start of stall until the point of time t1 when the timer T reaches the current-carrying enabling time (time 1).

When the timer T reaches a current-carrying enabling time (time 1) at the point of time t1, the timer T is cleared (STEP 122), a decreased torque command value Tb1 is calculated, and a torque command value gradually approaches the decreased torque command value Tb1.

An explanation will now be given to the case where a cooling-water temperature is low. A torque command value Ta at the time of stall in this case is the same as that in the case where the cooling-water temperature is high, a current-carrying enabling time (time 2 in this case) is calculated at time t0 (STEP 114), and the timer T begins counting (STEP 118). In addition, time 2 is longer than time 1. The torque command value remains to be the torque command value Ta at the start of stall until a point of time t2, at which the timer T reaches a current-carrying enabling time (time 2).

And, when the timer T reaches a current-carrying enabling time (time 2) at the point of time t2, the timer T is cleared (STEP 122), a decreased torque command value Tb2 is calculated, and a torque command value gradually approaches the decreased torque command value Tb2. In addition, a decreased torque command value in case of a cooling-water temperature being high is lower as compared with that in case of a cooling-water temperature being low. This is because the higher a cooling-water temperature, the smaller a continuous operation enabling torque command value as shown in FIG. 3.

As is apparent from the above description, according to the embodiment, in the case where a vehicle is put in a stall state, the control device 30 calculates a current-carrying enabling time from the curves (an operation expression or a three-dimensional map) shown in FIG. 4 on the basis of a cooling-water temperature at the start of stall and a torque value at that point of time and controls the motor 10 at a torque value at the start of stall until the calculated current-carrying enabling time has elapsed (STEP 116 to STEP 120, STEP 106). Thereby, in the case where a cooling-water temperature, or an atmospheric temperature is high, temperatures of the switching elements 23a, 23b, 23c, 24a, 24b, 24c, that constitute an inverter device 20, are prevented from reaching the breaking temperatures before a current-carrying enabling time is reached, and so the switching elements 23a, 23b, 23c, 24a, 24b, 24c can be surely prevented from thermally breaking. Also, in the case where the atmospheric temperature is low, the inverter device 20 can adequately exhibit its performance because temperatures of the switching elements 23a, 23b, 23c, 24a, 24b, 24c are somewhat lower than the breaking temperatures when the current-carrying enabling time has elapsed. Accordingly, it is possible to surely protect the inverter device 20 and to have the inverter device 20 adequately exhibit its performance.

Also, because the control device 30 controls the motor 10 at a torque short of that torque value at the time of stall, which is calculated on the basis of a refrigerant temperature, after the current-carrying enabling time, calculated in STEP 114, has elapsed (STEP 120 to STEP 124), the control device 30 controls the motor 10 at a torque short of that torque value at the time of stall, which is calculated on the basis of the cooling-water temperature, after the current-carrying enabling time has elapsed. Accordingly, even after the current-carrying enabling time has elapsed, it is possible to control the motor 10 taking into account the cooling-water temperature, so that the inverter device 20 can adequately exhibit its performance.

Also, when a vehicle is put in a stall state and the inverter device is put in a predetermined state (state of overheat), the control device 30 changes restrictions on an output torque of the motor on the basis of a refrigerant temperature detected in STEP 110 (STEP 124). Accordingly, it is possible to control the output torque of the motor taking account of a refrigerant temperature, and so it is possible to surely protect the inverter device.

Also, because the control device 30 restricts the output torque of the motor 10 to a continuous operation enabling torque calculated on the basis of a refrigerant temperature (STEP 112 to STEP 124), it is possible to control the motor taking into account the refrigerant temperature, so that stoppage of a drive current is reduced and so it is possible to have the inverter device adequately exhibit its performance.

In addition, while a cooling water is adopted as a refrigerant and a cooling-water temperature is measured to be used for controlling in the embodiment, temperature of other refrigerants than a cooling water may be measured and used for controlling.

Briefly reviewing the exemplary embodiment, the invention has a feature in a control device for a motor that drives a vehicle and for controlling the motor by controlling an inverter device that converts a direct voltage supplied from a direct current source, into an alternating voltage to supply the same to the motor, the control device comprising refrigerant temperature detection means that detects a refrigerant temperature of a heat exchanger for heat exchange with the inverter device, and torque restriction means that restricts an output torque of the motor when the inverter device is put in a predetermined state, wherein the torque restriction means changes restrictions on the output torque on the basis of the refrigerant temperature detected by the refrigerant temperature detection means.

A further feature is that the torque restriction means causes the motor to operate continuously irrespective of a state of the inverter device when a torque command value of the motor is smaller than a continuous operation enabling torque that is calculated on the basis of the refrigerant temperature and affords continuously operating the motor.

Yet another feature is further including stall state detection means that detects a stall state of the vehicle, and the torque restriction means comprises storage means that stores an operation expression or a map, that was previously developed to be representative of the correlation among the refrigerant temperature, a torque command value, and time, during which an electric current can be carried to the motor, and means that calculates a current-carrying enabling time from the operation expression or the map on the basis of a refrigerant temperature and a torque command value, and when the stall state detection means detects a stall state, the output torque is restricted after the current-carrying enabling time calculated by the time calculation means has elapsed. In addition, the torque restriction means restricts an output torque of the motor to a continuous operation enabling torque calculated on the basis of the refrigerant temperature.

In the exemplary embodiment, when the inverter device is put in a predetermined state, the torque restriction means changes restrictions on the output torque of the motor on the basis of the refrigerant temperature detected by the refrigerant temperature detection means. Accordingly, it is possible to control the output torque of the motor taking into account the refrigerant temperature, and so it is possible to surely protect the inverter device.

Further, a comparison is made between a continuous operation enabling torque and a torque command value of the motor on the basis of results of which comparison the motor is continuously operated. Accordingly, it is possible to have the inverter device adequately exhibiting its performance in accordance with the refrigerant temperature.

And, in the case where a vehicle stalls, or is in the stall state, the current-carrying enabling time calculation means is used to calculate a current-carrying enabling time from the operation expression or the map on the basis of a refrigerant temperature and a torque command value, and the torque restriction means restricts an output torque after the current-carrying enabling time as calculated has elapsed. Thereby, in the case where a refrigerant temperature is high, the switching elements that constitute the inverter device are prevented from reaching the breaking temperatures thereof before a current-carrying enabling time is reached, and so it is possible to surely prevent the switching elements from being thermally broken. Also, in the case where a refrigerant temperature is low, the inverter device can adequately exhibit its performance because temperatures of the switching elements are somewhat lower than the breaking temperatures when the current-carrying enabling time has elapsed. Accordingly, it is possible to surely protect the inverter device and to have the inverter device adequately exhibiting its performance.

It is also possible to control the motor taking account of a refrigerant temperature and so the stoppage of a drive current is reduced whereby it is possible to have the inverter device adequately exhibit its performance.

What is claimed is:

1. A control device for a motor that drives a vehicle and controls the motor by controlling an inverter device that converts a direct voltage, supplied from a direct current source, into an alternating voltage to be supplied to the motor, the control device comprising:
   a refrigerant temperature detector that detects a refrigerant temperature of a heat exchanger for heat exchange with the inverter device, and
   a torque restrictor that restricts an output torque of the motor when the inverter device is put in a state of overheat, wherein the torque restrictor restricts the output torque to a calculated continuous operation enabling torque so that the output torque when the refrigerant temperature detected by the refrigerant temperature detector is high is lower as compared with the output torque when the refrigerant temperature is low.

2. The control device according to claim 1, wherein the torque restrictor causes the motor to operate continuously irrespective of a state of the inverter device when a torque command value of the motor is smaller than the continuous operation enabling torque that is calculated on the basis of the refrigerant temperature and affords continuously operating the motor.

3. The control device according to claim 2, further comprising a stall state detector that detects a stall state of the vehicle, wherein the torque restrictor has a storage device that stores at least one of a predetermined operation expression and a map found to be representative of the correlation among the refrigerant temperature, a torque command value, and time, during which an electric current can be carried to the motor, and
   a current-carrying enabling time calculation element that calculates a current-carrying enabling time from the at least one of the predetermined operation expression and the map on the basis of a refrigerant temperature and a torque command value, wherein when the stall state detector detects the stall state, the output torque is restricted after a current-carrying enabling time calculated by the current-carrying enabling time calculation element has elapsed.

4. The control device according to claim 1, further comprising a stall state detector that detects a stall state of the vehicle, wherein the torque restrictor comprises a storage device that stores at least one of a predetermined operation expression and a map found to be representative of the correlation among the refrigerant temperature, a torque command value, and time, during which an electric current can be carried to the motor, and
   a current-carrying enabling time calculation element that calculates a current-carrying enabling time from the at least one of the predetermined operation expression and the map on the basis of a refrigerant temperature and a torque command value, wherein when the stall state detector detects the stall state, the output torque is restricted after a current-carrying enabling time calculated by the current-carrying enabling time calculation element has elapsed.

5. A control device for a motor that drives a vehicle and for controlling the motor by controlling an inverter device that converts a direct voltage supplied from a direct current source, into an alternating voltage to be supplied to the motor, the control device comprising:
   refrigerant temperature detection means for detecting a refrigerant temperature of a heat exchanger for heat exchange with the inverter device, and
   torque restriction means for restricting an output torque of the motor when the inverter device is put in a state of overheat, wherein the torque restriction means restricts the output torque to a calculated continuous operation enabling torque so that the output torque when the refrigerant temperature detected by the refrigerant temperature detection means is high is lower as compared with the output torque when the refrigerant is low.

6. The control device according to claim 5, wherein the torque restriction means causes the motor to operate continuously irrespective of a state of the inverter device when a torque command value of the motor is smaller than the continuous operation enabling torque that is calculated on the basis of the refrigerant temperature and affords continuously operating the motor.

7. The control device according to claim 6, further comprising stall state detection means for detecting a stall state of the vehicle, wherein the torque restriction means comprises storage means that stores at least one of a predetermined operation expression and a map and found to be representative of the correlation among the refrigerant temperature, a torque command value, and time, during which an electric current can be carried to the motor, and
   current-carrying enabling time calculation means for calculating a current-carrying enabling time from the at least one of the predetermined operation expression and the map on the basis of a refrigerant temperature and a torque command value, wherein when the stall state detection means detects the stall state, the output torque is restricted after a current-carrying enabling time calculated by the current-carrying enabling time calculation means has elapsed.

8. The control device according to claim 5, further comprising stall state detection means for detecting a stall state of the vehicle, wherein the torque restriction means comprises storage means for storing at least one of a predetermined operation expression and a map and found to be representative of the correlation among the refrigerant temperature, a torque command value, and time, during which an electric current can be carried to the motor, and current-carrying enabling time calculation means for calculating a current-carrying enabling time from the at least one of the predetermined operation expression or map on the basis of a refrigerant temperature and a torque command value, wherein when the stall state detection means detects the stall state, the output torque is restricted after a current-carrying enabling time calculated by the current-carrying enabling time calculation means has elapsed.

9. A method for control of a motor, that drives a vehicle, by controlling an inverter device that converts a direct voltage supplied from a direct current source, into an alternating voltage to be supplied to the motor, the method comprising:
    detecting a refrigerant temperature of a heat exchanger for heat exchange with the inverter device, and
    restricting an output torque of the motor when the inverter device is put in a state of overheat, wherein the output torque is restricted to a calculated continuous operation enabling torque so that the output torque when the refrigerant temperature is high is lower as compared with the output torque when the refrigerant temperature is low.

10. The method according to claim 9, further comprising causing the motor to operate continuously irrespective of a state of the inverter device when a torque command value of the motor is smaller than the continuous operation enabling torque that is calculated on the basis of the refrigerant temperature and enables continuously operating the motor.

11. The method according to claim 10, further comprising:
    detecting a stall state of the vehicle;
    storing at least one of a predetermined operation expression and a map found to be representative of the correlation among the refrigerant temperature, a torque command value, and time, during which an electric current can be carried to the motor; and
    calculating a current-carrying enabling time from the at least one of the predetermined operation expression and the map on the basis of a refrigerant temperature and a torque command value, wherein when the stall state is detected, restricting the output torque after the current-carrying enabling time has elapsed.

12. The method according to claim 9, further comprising:
    detecting a stall state of the vehicle;
    storing at least one of a predetermined operation expression and a map found to be representative of the correlation among the refrigerant temperature, a torque command value, and time, during which an electric current can be carried to the motor; and
    calculating a current-carrying enabling time from the at least one of the predetermined operation expression and map on the basis of a refrigerant temperature and a torque command value, wherein when the stall state is detected, restricting the output torque after the current-carrying enabling time has elapsed.

* * * * *